United States Patent [19]

Stemmle

[11] 4,111,547

[45] Sep. 5, 1978

[54] DUPLEX DOCUMENT COPYING

[75] Inventor: Denis J. Stemmle, Williamson, N.Y.

[73] Assignee: Xerox Corporation, Stamford, Conn.

[21] Appl. No.: 806,565

[22] Filed: Jun. 14, 1977

[51] Int. Cl.[2] ........................ G03B 27/32; G03B 27/52

[52] U.S. Cl. ........................................ 355/24; 355/51; 355/76; 355/77

[58] Field of Search .................... 355/8, 75, 23, 24, 50, 355/51, 76, 77; 271/3

[56] References Cited

U.S. PATENT DOCUMENTS

| | | | |
|---|---|---|---|
| 3,079,839 | 3/1963 | Lohner et al. .......................... | 355/24 |
| 3,936,171 | 2/1976 | Brooke .................................... | 355/23 |
| 3,981,580 | 9/1976 | Yamashita ............................... | 355/24 |

*Primary Examiner*—Richard A. Wintercorn

[57] ABSTRACT

A web/scroll duplex document handling system for a copier which provides document recirculation for precollation copying of both sides of the documents. The document is positively retained at all times by positive engagement by a document supporting web. A document is unobstructedly imaged on one side on one web, then transferred to another web while the two webs both engage the document without relative movement, and then the other side of the document is unobstructedly imaged on the other web. The two webs may be separately wound on four scrolls or a three scroll system may be provided in which one end of both webs is commonly wound on a single scroll. A set of documents are selectively wound and unwound between respective scrolls and transferred between webs to automatically provide duplex copying.

8 Claims, 3 Drawing Figures

DUPLEX DOCUMENT COPYING

SUMMARY AND BACKGROUND OF THE INVENTION AND CITATION OF ART

This invention relates to a document handling system for copiers in which the documents may be recirculated for pre-collation copying of both sides of the documents while positively retained in a document transport belt system.

The present invention is an improvement in the pre-collation copying system of U.S. Pat. No. 4,008,956, issued Feb. 22, 1977, to the present applicant, D. J. Stemmle. A similar disclosure is provided in U.S. Pat. No. 3,963,345, issued June 15, 1976, to the same D. J. Stemmle together with M. Silverberg.

These above-cited patents disclose a system for the multiple recirculation of a plurality of individual pre-separated documents in pre-collated order while the documents are continuously retained in a web/scroll system during and between document recirculations. Since that basic web/scroll pre-collation document handling system is utilized herein these patents are incorporated by reference herein. Also incorporated by reference is application Ser. No. 701,371, filed June 30, 1976, now U.S. Pat. No. 4,050,816, issued Sept. 27, 1977 by the same D. J. Stemmle disclosing a similar and related system in which the document is held between two webs. Various art on pre-collation copying systems and on web document transport systems for copying is cited and discussed in these patents and that application and need not be reiterated here.

As taught in the above-cited patents, automatic document recirculation for pre-collation copying with positive, continuous, single system document retention minimizes undesirable document handling, especially transfers between different document transport systems. It is highly desirable for the protection of the documents and the improvement in overall copying effectiveness. This system maximizes document protection by providing continuous support and retention of the documents at alltimes on a document supporting web with no significant slippage between the documents and the web. Further, the web provides an appropriate optical background for the document being copied with minimal background print-out on copies. The present system retains these advantages yet provides the further advantage of unobstructed automatic copying of both sides of the documents.

Exemplary embodiments of the present invention are shown and described hereinbelow incorporated into an otherwise conventional exemplary xerographic apparatus and process. However, it is not limited thereto. The xerographic apparatus and process itself need not be described herein since various patents and known apparatus are available to teach details thereof to those skilled in the art, including those cited above. The present document handling system may be utilized with various known copier optics systems and processing systems. It may be utilized with either a duplex/simplex or duplex/duplex system or mode of operation and in various duplex systems, as will be further discussed herein.

The term "duplex copying" may cover several different copying modes. In duplex/duplex copying, both sides of a document sheet are copied onto both sides of a single copy sheet. In duplex/simplex copying, both sides of a document with images on both sides are copied onto only one side of two successive copy sheets. In simplex/duplex copying, one side of two successive documents (or two page images from microfilm, computer generated output, or the like) are placed on opposite sides of a copy sheet.

The duplex copying of the copy sheets may be done by feeding a set of finished simplexed copy sheets (copy sheets printed only on their first side) through the copying processor for a second pass printing of the second document side image on the opposite side of that copy sheet. Such systems may be referred to as sequential or dual pass duplexing systems. Examples of such systems are shown in U.S. Pat. No. 3,615,219, issued Oct. 26, 1971, to W. A. Drawe, et al., and No. 3,645,615, issued Feb. 29, 1972, to M. R. Spear, Jr., for example.

Alternatively, a single pass or simultaneous duplex system may be used in which unfused images are transferred to both sides of the copy sheet in a single pass, simultaneously or in immediate sequence. Examples of such single pass duplex systems are disclosed, for example, in U.S. Pat. No. 3,697,171, issued Oct. 10, 1972, to W. A. Sullivan, and No. 3,847,478, issued Nov. 12, 1974, to E. F. Young, and the art cited therein.

In the printing industry as opposed to the copy industry, two-sided copying may be referred to as "backing-up".

The present invention is directed to duplex copying systems in which the image sources are a set of original document sheets with images on both sides thereof, in which these duplex documents are automatically recirculated with automatic exposure of both sides of the documents so as to provide either duplex/duplex or duplex/simplex pre-collation copying. It may be utilized with either. In the duplex/duplex mode it may be utilized with either dual pass or single pass copy duplexing systems as described above.

Considering now the art, it may be seen that of particular interest to the present application is art cited below relating to systems providing copying of the images on both sides of document sheets. U.S. Pat. No. 3,862,802, issued Jan. 28, 1975, to H. R. Till discloses a system in which the documents are transported upon a web, wound into a scroll with that web and then ejected from the web in reverse orientation to provide for copying of the second side of a set of documents. However, automatic document recirculation with positive document retention is not provided.

In U.S. Pat. No. 3,844,654, issued Oct. 29, 1974, to J. Guenther, a duplex copying system is disclosed with a document belt for moving documents over a first exposure station and then onto and from a document drum which provides a second exposure station for the opposite sides of the documents.

Patents on apparatus for photographing both sides of documents in which the documents are transported on belts during copying include U.S. Pat. No. 2,194,808, issued Mar. 26, 1940, to F. D. Pooley, Jr., and 3,079,839, issued Mar. 5, 1963, to E. E. Lohner, et al..

Other examples of patents disclosing apparatus for copying both sides of documents includes U.S. Pat. No. 3,227,444, issued Jan. 4, 1966, to J. F. Egan; No. 3,288,464, issued Nov. 29, 1966, to R. W. Thompson; No. 3,318,212, issued May 9, 1967, to D. Rubin; No. 3,408,140, issued Oct. 29, 1968, to K. W. Hemphill; No. 3,506,347, issued Apr. 14, 1970, to C. F. Carlson; No. 3,536,398, issued Oct. 27, 1970, to G. C. Bhagat; No. 3,561,865, issued Feb. 9, 1971, to L. L. Burdick, Jr.; No. 3,672,765, issued June 27, 1972, to C. Altmann; No.

3,936,171, issued Feb. 3, 1976, to E. R. Brooke; and No. 3,947,270, issued Mar. 30, 1976, to A. J. North.

BRIEF DESCRIPTION OF THE DRAWINGS

Further objects, features, and advantages of the present invention pertain to the particular apparatus and steps whereby the above-mentioned aspects of the invention are attained. Accordingly, the invention will be better understood by reference to the following description, and to the drawings forming a part thereof, which are approximately to scale, wherein.

DETAILED DESCRIPTION OF THE PREFERRED EMBODIMENTS

Figure 1:
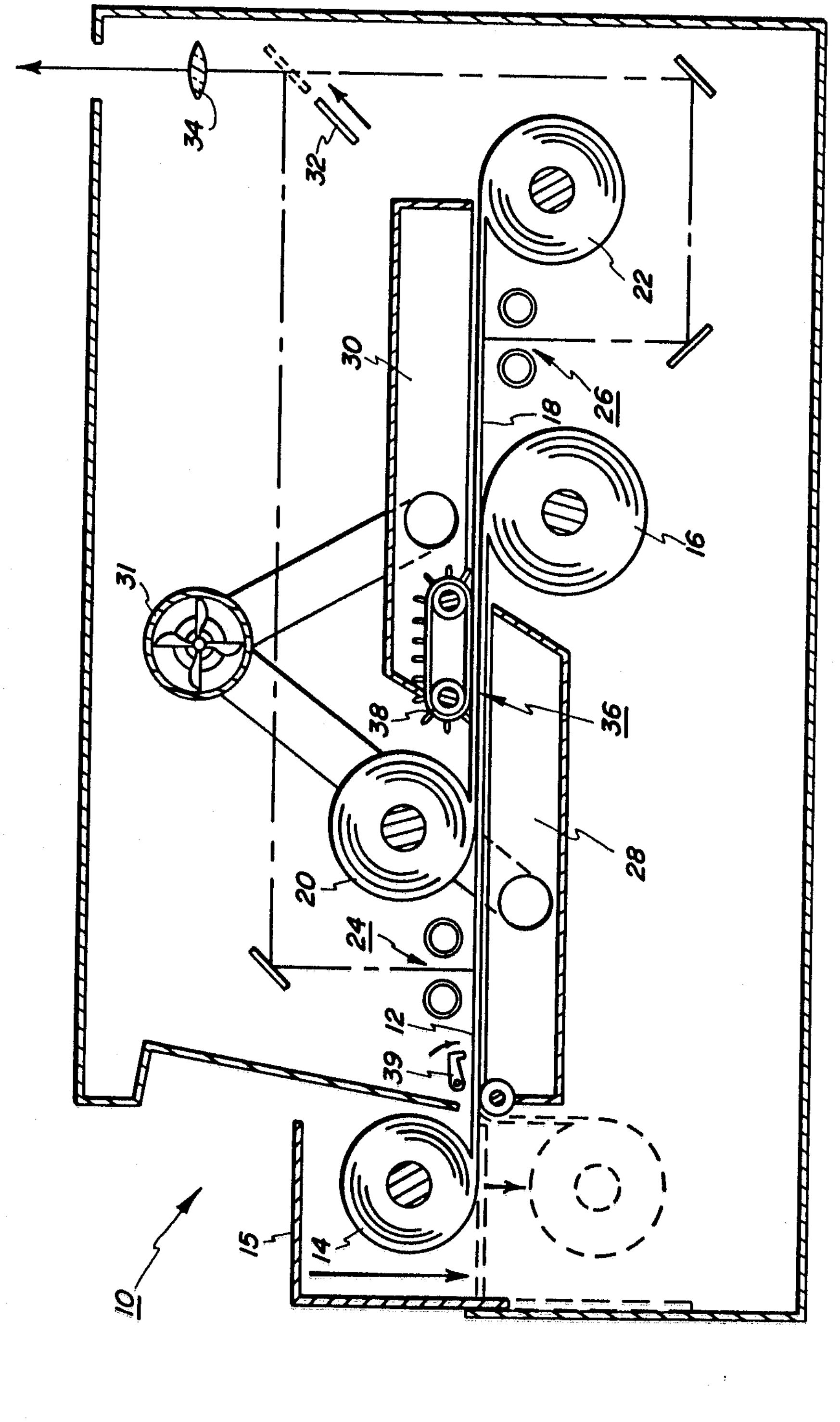
FIG. 1 is a cross-sectional side view of an exemplary automatic duplex document handling system in accordance with the present invention.
Figure 2:
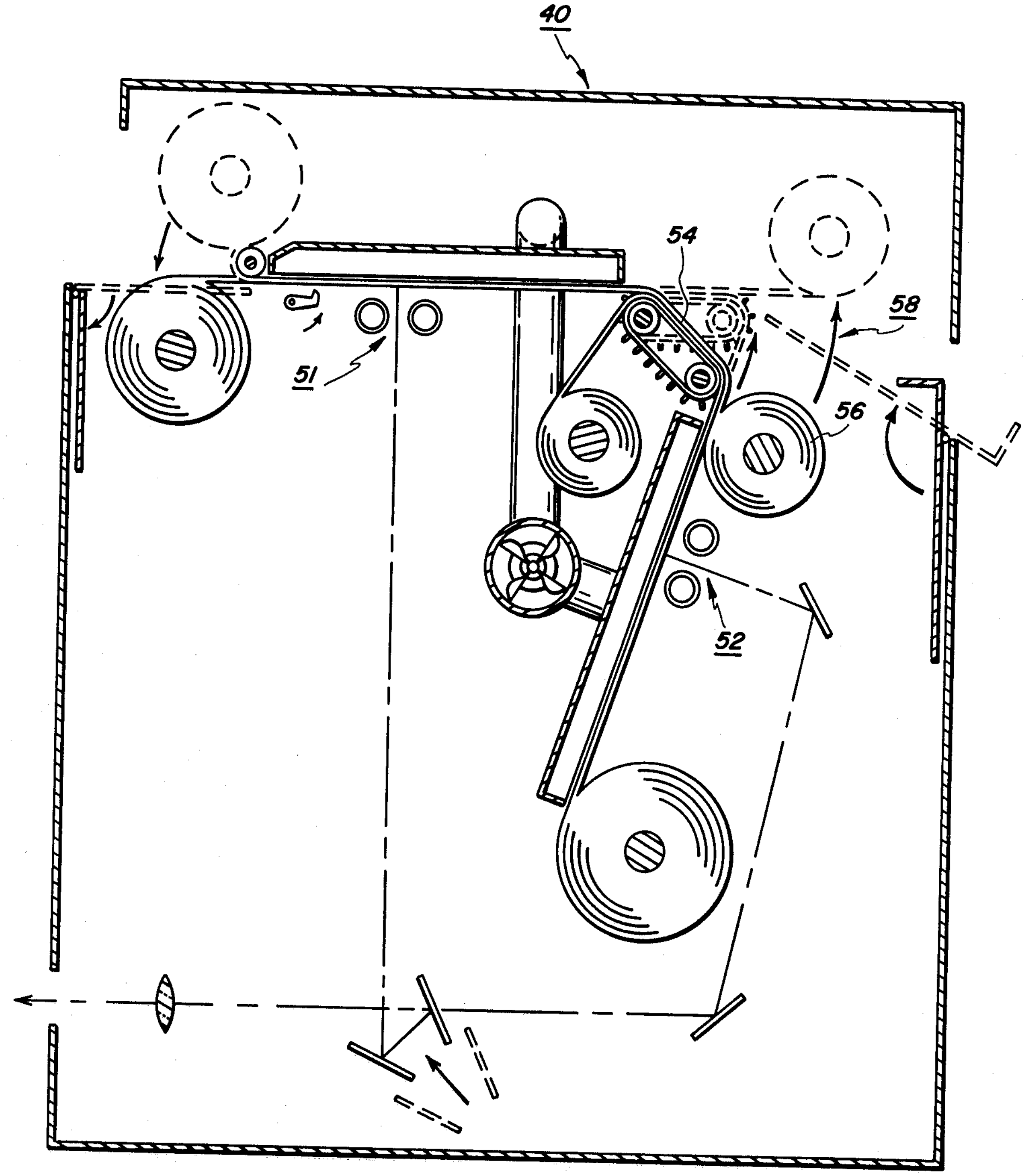
FIG. 2 is a cross-sectional side view of a second such exemplary automatic duplex document handling system.
Figure 3:
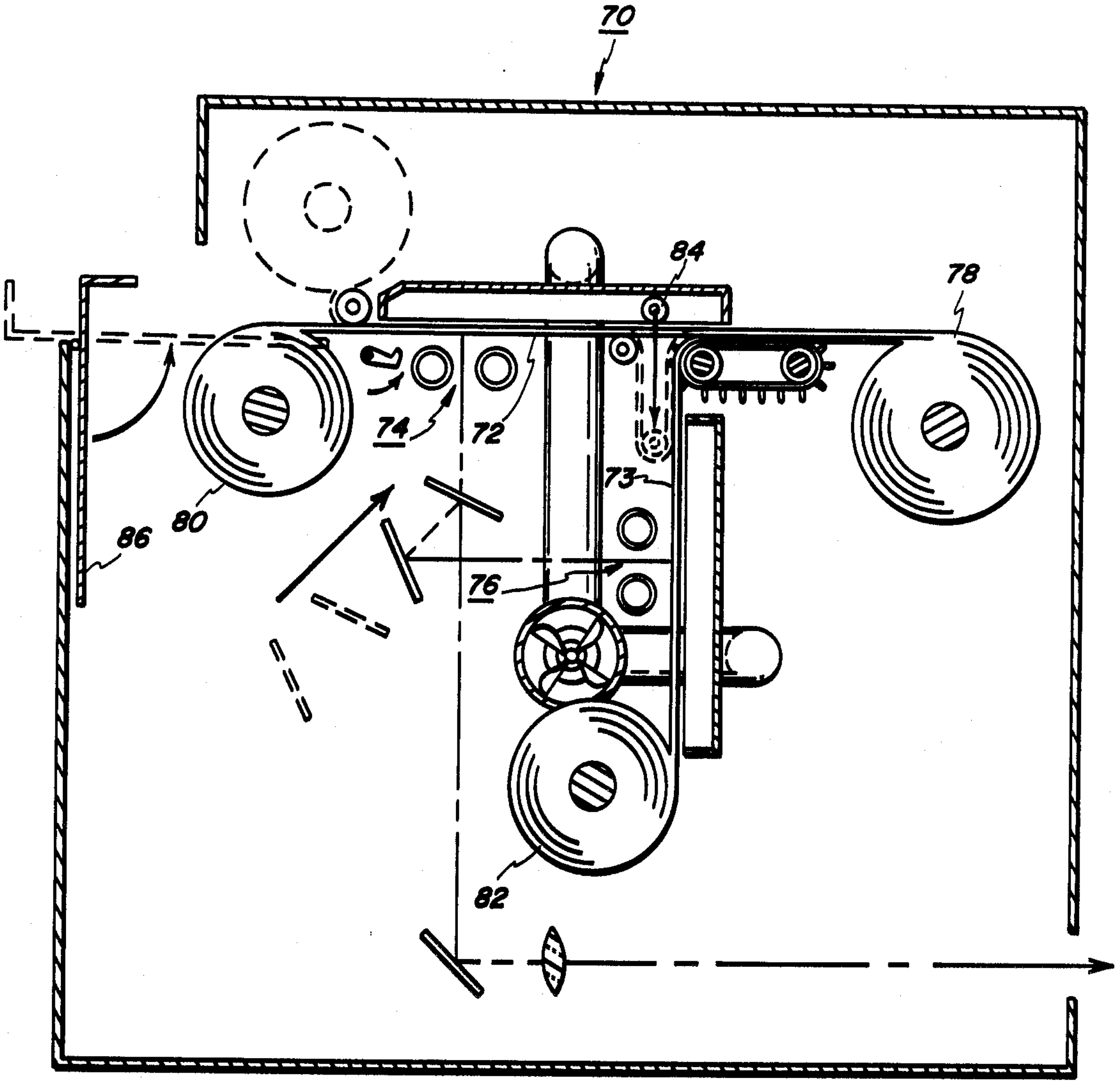
FIG. 3 is a cross-sectional side view of a third such exemplary automatic duplex document handling system.

FIGS. 1, 2, and 3 illustrate three examples of the present invention. It will be appreciated that the subject duplex document handling system may have many other different structures and orientations, and different combinations with different exemplary xerographic or other copying systems and optics systems therefor.

All three of the embodiments 10, 40, and 70 of FIGS. 1 through 3, respectively, are fully automatic document handling systems (DHS), into which a set of documents may be loaded (manually or automatically) stored, and automatically recirculated by a desired number of circulations to provide pre-collated output copy sets. Each individual document is exposed in sequence for copying in each recirculation of the document set. The documents may be conventional sheets of paper or other materials of various sizes.

In all of the embodiments 10, 40, and 70, all of the documents are held at all times in non-slipping unobstructed engagement by a fully supporting and underlying document web. During imaging, the one side of the document being imaged is unobstructedly exposed, while the opposite side of that same document is fully supported and retained by a fully underlying web, against which the document is vacuum retained by a vacuum applied through that web. Those documents not being copied are stored for their subsequent copying recirculations fully wound within scrolls of the webs. At no time is imaging being done through any web. Thus, transparent webs are not required, and there are no problems of contamination of the web affecting the imaging of the documents. Further, all of the systems 10, 40, and 70 are fully compatible with documents with images on only one side thereof. That is, they may be utilized for simplex document copying as well as duplex document copying.

As indicated above, U.S. Pat. No. 4,008,956 issued Feb. 22, 1977 to the same inventor may be referred to for further detailed descriptions, as desired, of the construction and operation of components of the web scroll system herein.

Referring now specifically to the first embodiment 10 of FIG. 1, it may be seen that a first document supporting web 12 is wound and unwound between its respective scrolls 14 and 16. A second web 18 is wound and unwound between its separate scrolls 20 and 22. Documents in the system 10 are imaged on one side thereof at a first imaging station 24 on the first web 12. The other side of each document is imaged at a second imaging station 26 on the second web 18. These respective exposures are on separate exposed (unwound) intermediate portions of the two webs between their respective scrolls. Respective first and second vacuum chambers 28 and 30 underlie the two unwound intermediate segments of the two webs opposite from their document supporting sides so as to apply a vacuum rentention force through the webs to retain the documents thereon, including through the imaging stations 24 and 26.

An automatically repositionable mirror 32 is provided to select between two optical paths to the two different imaging stations 24 and 26. Both paths provide the same number of reflections and utilizes the same lens system 34, so that images from either imaging station may be selectively applied in the same manner to the copier photoreceptor, as illustrated by the output light path arrow from the lens 34.

It may be seen that portions of the two unwound intermediate segments of the two webs 12 and 18 are overlapped or sandwiched within a document transfer area or region 36. Within that region 36, the two webs 12 and 18 here are also commonly driven by a common drive system 38 which provides a desired integral movement of the webs and the documents therebetween. Here this drive system 38 is illustrated by a conventional "kidder" drive in which the sprockets thereof extend through common overlying sprocket holes in the two webs so as to positively lock the movement of the two webs to one another. However, it will be appreciated that a frictional pinch drive roller system or other suitable drive system may also be utilized at the edges of the overlapping webs. This insures that there is no relative movement between the two webs and that a document may be transferred from one web to the other in this transfer region 36 without any relative movement between the document and either of the two webs. Therefore, there is no significant slippage or loss of control or registration of the document relative to the webs. Additionally, with the system here, only a single drive system is required to maintain the movement of the webs synchronized with the movement of the photoreceptor at both imaging stations 24 and 26.

Suitable, non-critical tensioning means may be provided for all of these scrolls to maintain the webs under tension and to provide the winding up of the webs on the scrolls. For example, opposingly conical spools or reels (not shown) may be provided on the shafts of the opposing scroll pairs 14–16 and 20–22 of each web, with a tensioned wire wound between the spools to transmit motion between one scroll shaft and the other. Note that the actual web drive, however, is preferably provided by a suitable drive system 38 acting on the intermediate portion of the web adjacent the imaging stations rather than on the scroll axes.

In the embodiment 10, loading and unloading of a set of documents is accomplished by lowering the scroll 14 to its illustrated dashed-line position in the direction of the illustrated arrow. Integrally with this movement of the scroll 14 is a corresponding movement of the scroll shroud 15 into its illustrated dashed-line position. It provides there a loading and unloading tray or surface for loading documents directly onto the exposed intermediate portion of the first web 12, into a registration gate 39. During loading the web is incrementally advanced to load the documents into the scroll system. Conversely, for unloading, the documents are rapidly automatically unloaded and outwardly ejected onto the output area provided by the scroll shroud 15 by the illustrated self-stripping deformation of the web 12 at this exist area when the scroll 14 is in the dashed-line position.

Considering now the operation of the embodiment 10 of FIG. 1, as each document of the document set to be recirculated is loaded into the system, it passes the first exposure station 24 transpored on the first web 12, and one side of the document is exposed there. Then the document enters the nip between the first web 12 and the second web 18 while still retained against the web 12 by the vacuum manifold 28 within the document transfer region 36. The document transporting sides of the rolls face one another in this region. The second web 18 is only applied over the document after it has passed through the first imaging station 24, so that the light path therefrom does not at any time pass through either of the webs. This is provided here by positioning the scroll 20 downstream from the first imaging station. While the document is within the document transfer region 36, and held between the two webs, it comes into the effective area of the second, and opposing, vacuum chamber 30 and leaves the effective area of the first vacuum chamber 28. Then, still within the transfer area 36, the first web 12 is arcuately stripped away from the document while the document is retained in a linear path on the second web 18 and positively held against the second web 18 by the second vacuum chamber 30. Thus, the document is retained on the second web 18 both by vacuum retention and by its own beam strength. The vacuum chambers 28 and 30 may be commonly connected to a single vacuum fan or blower 31.

The stripping of the first web 12 here is directly into the scroll 16, which is positioned upstream from the second imaging station 26 so that the light path to the second imaging station 26 likewise does not ever pass through either of the webs.

In the second imaging station 26 the document is supported from its side opposite to that in the first imaging station 24, by the second web 18. Thus, the opposite side of the document is unobstructedly exposed in the second imaging station 26, to provide completely unobstructed imaging of the two opposite sides of the document in two separate imaging stations.

No transparent guides or holders are required for either side of the document in either imaging station. This is an important advantage since transparent belts, platens or guides are subject to contamination which undesirably prints-out on copy sheets, and may actually obscure part of the image, and requires frequent cleaning or replacement of such transparent members. In a high-speed machine handling a large number of documents this contamination problem can be severe, since documents notoriously generate contaminants such as paper lint, or loose (unfused) toner, and may carry other contaminants thereon. Further, the documents on their contaminants may be sufficiently abrasive to cause scratches or other image obscuring damage to glass or plastic surfaces through which the image must pass in such other systems.

It may be seen that with the system 10, and also the systems 40 and 70, that the document does not have to be taken out of the system and inverted and reinserted therein for copying of the second side of the documents. Further, with this system even re-registration between the first and second side imaging of the documents is not required. Registration between the documents and the webs on which they are transported is maintained at all times. Therefore, marking or signaling indicia may be provided on the webs themselves and utilized to coordinate the document positions with the copier in which they are being copied. That is, registration and velocity coordination may be maintained between the web and the photoreceptor through the drive means for the web, rather than directly with the individual documents, once they have been initially registered on the first web.

After passing through the second imaging station 26 the second web 18 and the documents thereon is wound up within the scroll 22, which forms a nip with the document transporting side of the second web 18 so as to capture and interleavingly wind up the documents therein.

After all the documents have been loaded into the system 10 and copied at the two imaging stations (assuming that there are images on both sides) the drive system 38 is reversed to rewind both of the webs 12 and 18 from their respective scrolls 16 and 22 back into their scrolls 14 and 20. The scroll 14 is now in its illustrated solid-line position, so that both webs are planar and extend linearly between their respective scrolls to prevent beam stripping of the documents from either web. During this rewind the documents may be re-imaged at the respective imaging stations 24 and 26, or a fast rewind may be used, depending upon whether the copying system is uni-directional or bi-directional.

After all of the documents have been re-wound up into the scroll 14, the drive system 38 is reversed again to begin the next subsequent copying run. This sequence may be repeated as many times as desired to provide as many copy sets as are desired, since there is virtually no wear on the documents with this system. No re-registration is required after the initial loading registration of the documents.

The present document handling system offers all of the advantages of the systems disclosed in the incorporated U.S. Pat. No. 3,008,956 for providing pre-collated copy sets by repeated recirculation of the documents accomplished automatically without operator intervention. The documents do not have to be mechanically handled by the operator in any way once they are loaded.

A further significant feature of the embodiments 10 and 40 of both FIGS. 1 and 2 is that the copying of the second side of each document is immediately subsequent to, and immediately downstream of, the copying of the first side of the same document. That is, the two sides of each document are imaged in rapid succession individually before each subsequent document is imaged. Thus, the embodiments 10 and 40 are particularly well suited to the previously described simultaneous or single pass duplex/duplex systems in which the first and second document side images are simultaneously or substantially simultaneously applied to the first and second sides of each copy sheet, i.e., without requiring a set of copy sheets printed on only one side to be collected and re-fed through the copier to print the second sides thereon in a subsequent recirculation of the documents. However, the system 10 and 40 may also be used for the latter type of duplex/duplex system simply by utilizing only one of the imaging stations during each copy run. This may be accomplished simply by switching the position of mirror 32 only upon the change in direction of the webs rather than upon each passage of a document between the first imaging station 24 and the second imaging station 26, as would be done automatically for a simultaneous duplex/duplex system or for a duplex/simplex system.

Referring now specifically to the second embodiment 40 of FIG. 2, the foregoing description of the embodiment 10 of FIG. 1 is generally applicable thereto. It differs primarily in that its second imaging station 52 is oriented in a different plane from its first imaging station 51. This is accomplished by curving the path of the two exposed intermediate portions of the two webs in their overlapping document transfer region 54. Further, here in this same region 54, one of the scrolls 56 for the first web is repositionable to allow a separate document stripping area 58 at a different location from the document input or loading area.

When the scroll 56 is in its normal solid-line position the second web overlies the first web in the entire transfer area 54, i.e., the entire curve transition between the two planes of the two imaging stations. This normally prevents the documents from beam-stripping from either web in this sole non-planar region of the webs. In all other exposed (unwound) areas of the webs, the webs are planar and the document is retained thereagainst by continuously underlying vacuum chambers as in the embodiment of FIG. 1.

Referring now to the third embodiment 70 of FIG. 3, there are likewise two separate webs 72 and 73 providing two separate imaging stations 74 and 76 for the opposite sides of the document. However, here one end of both webs 72 and 73 are commonly wound on a single scroll 78, along with the set of documents sandwiched therebetween. The other end of the web 72 is wound on an individual scroll 80, and the other end of the web 73 is wound on an individual scroll 82, separately and spaced apart as in the embodiments of FIGS. 1 and 2. This system reduces the number of scrolls required by one, although, of course, the commonly wound scroll 78 will have a larger maximum diameter than the other two scrolls 80 and 82.

A further significant difference in the embodiment 70 of FIG. 3 is that the first side of all of the documents in the document set being loaded are all imaged in sequence at the first imaging station 24 and then wound up into the scroll 78 upon loading. That is, none of the documents pass through the second imaging station 76 for imaging of the second side of the documents at that time. In this system 70, the set of documents, or a selected number thereof, are all imaged in sequence on only one side at a selected one of the two imaging stations in each web circulation rather than each document being copied on both sides in immediate sequence during each set recirculation as in the embodiments of FIGS. 1 and 2.

In the embodiment 70, to copy the second side of the documents, after the documents have been first wound up into the scroll 78, means are provided to arcuately deflect the path of the first web 72 so as to cause the documents to strip therefrom onto the second web 73, and thereby be transported on the second web 73 through the second imaging station 76 and into the scroll 82 rather than the scroll 80. This is illustrated here by a displaceable roller 84 which may be repositioned to its illustrated dashed-line position to form the illustrated dashed-line position bight or loop in the web 72. It may be seen that this causes a sharp arcuate stripping of the web 72 away from the web 73 over the vacuum chamber underlying the web 73 in a planar portion of the web 73, thereby insuring positive transfer of the documents from the web 72 to the web 73 as previously described.

In this system 70, the documents are not passed from the intermediate portion of one web to the intermediate portion of the other web between the two imaging stations. Rather, the document set is wound up in the commonly wound scroll 78 between exposures in the respective imaging stations. Thus, the system 70 of FIG. 3 is preferably utilized in a dual-pass duplex/duplex copying system in which a buffer set of copies printed on one side is generated in one circulation of the scrolls, and those copies are printed on the second side thereof during the next subsequent circulation of the scrolls.

The system of FIG. 70 may also be utilized for a duplex/simplex system by storing the first set of simplex copies generated from the first imaging station 74 on the first document recirculation and feeding them out of the copier inter-mixed (in alternating sequence) with the second document side simplex copies generated on the next circulation from the second imaging station 76.

Unloading of the documents after the selected number of document recirculations can be provided in this system 70 of FIG. 3 in the same manner as for the system 10 of FIG. 1. That is, the scroll 80 is raised to the dashed-line position illustrated and the tray 86 is raised into its dashed position, as indicated by the arrow, to receive the ejected documents. These same positions are utilized for the loading of the documents.

It will be appreciated that any of the systems 10, 40 or 70 are readily adaptable to variable magnification systems by conventional means for repositioning mirrors in the optics paths and/or the lens system, or by utilizing a zoom lens arrangement. The speed of the web drives may be readily changed proportionally to provide proportional relation of the image to the speed of the photoreceptor as is well known for variable magnification systems. Further, while all of the systems here are preferably moving document, stationary optics, slit scanning exposure systems, the invention is not limited thereto. That is, the exposure stations may be, for example, full frame flash exposure systems where the entire document is simultaneously imaged, and in that case the velocity of the webs does not have to be proportional to the movement of the photoreceptor surface being imaged.

The systems illustrated here may be either modular, as shown, or integral the copiers in which they are utilized.

In conclusion, it may be seen that there has been described herein an improved document handling system for the automatic copying of duplex documents. While the exemplary embodiments described herein are presently considered to be preferred, various other modifications or improvements will be apparent to those skilled in the art. The following claims are intended to cover all such variations and modifications as fall within the true spirit and scope of the invention.

What is claimed is:

1. In an automatic document handling system for making pre-collated copy sheet sets by repeated collated recirculation and imaging of a set of original documents, the improvement comprising:

first and second elongated windable document holding webs, said first and second webs each having a document supporting side adapted to support documents thereon for movement with said webs and for imaging of said documents thereon, said first and second webs being wound into spaced apart scrolls of said web, said first and second webs each having minor unwound intermediate unwound segments extending between said web scrolls;

first and second imaging stations for imaging documents on said unwound intermediate segments of said web for said copying of said documents;

said document supporting side of said first web being unobstructedly exposed at said first imaging station and said document supporting side of said second web being unobstructedly exposed at said second imaging station;

drive means for recirculating said first web through only said first imaging station, and said second web through only said second imaging station between said scrolls, to provide repeated recirculating unobstructed copying of documents thereon; and transfer means for transferring documents from said first web to said second web so that one side of the documents is exposed in said first imagaing station and the other side of the documents is exposed in said second imaging station, said transfer means being spaced from both said first and second imaging stations and including a transfer area in which said unwound intermediate segments of said two webs overlap one another to retain documents therebetween;

wherein said first and second webs are maintained at the same speed in said transfer area to prevent relative movement between said first and second webs and documents therebetween.

2. The document handling system of claim 1, wherein there are four said scrolls with each said web individually wound between two separate scrolls.

3. The document handling system of claim 1, wherein there are three said scrolls and said first and second webs are commonly wound on one said scroll.

4. The document handling system of claim 1, wherein said two webs are inter-connected by a common web driving means at said transfer area.

5. The document handling system of claim 1, further including means for optically switching between said first and second imaging stations.

6. The document handling system of claim 1, wherein said transfer means includes vacuum means for applying a vacuum through said first web in a first portion of said transfer area and for applying a vacuum through said second web in a second portion of said transfer area.

7. In an automatic document handling method for making pre-collated copy sheet sets by repeated collated recirculation and imaging of a set of original documents, the improvement comprising;

winding first and second elongated windable document holding webs between spaced apart scrolls of said web, moving minor unwound intermediate unwound segments of said first and second webs through respective first and second imaging stations for imaging documents on said unwound intermediate segments of said web for said copying of said documents with a document supporting side of said first web being unobstructed exposed at said first imaging station and a document supporting side of said second web being unobstructedly exposed at said second imaging station;

transferring documents from said first web to said second web in a transfer area in which said unwound intermediate segments of said two webs are overlapped to retain documents therebetween so that one side of the documents is exposed in said first imaging station and the other side of the documents is exposed in said second imaging station; and preventing relative movement between said first and second webs and documents therebetween in said transfer area.

8. The method of claim 7, further including applying a vacuum through said first web in one direction in a first portion of said transfer area and applying a vacuum through said second web in an opposite direction in a second position of said transfer area.

* * * * *